March 27, 1962 L. B. SCOTT 3,027,510

PRECISION A.C. TRANSDUCER

Filed March 31, 1958

2 Sheets-Sheet 1

LARKIN B. SCOTT
INVENTOR.

BY [signature]

ATTORNEY

PRECISION A.C. TRANSDUCER

Filed March 31, 1958 2 Sheets-Sheet 2

LARKIN B. SCOTT
*INVENTOR.*

BY [signature]

ATTORNEY 3,027,510

PRECISION A.C. TRANSDUCER

Larkin B. Scott, Fort Worth, Tex., assignor to The Perkin-Elmer Corporation, Norwalk, Conn., a corporation of New York Filed Mar. 31, 1958, Ser. No. 725,285
5 Claims. (Cl. 323—45)

The present invention relates to precision transducers for use in electrical apparatus and is particularly concerned with a novel precision transducing device by means of which any selected intermediate voltage may be derived from an input voltage. The new device possesses highly desirable input and output impedance characteristics as well as extraordinary linearity and precision of the output voltage with respect to its analog input. Because of the novel coaction of the electrical components used in the present device, comparatively high currents may be drawn from it without incurring adverse loading effects.

Typical embodiments of the present invention are compact, small in size, and may be capable of providing several hundred milliamperes of current, fully sufficient to drive a small torque motor, for instance. The large output current capabilities of the device therefore make it possible to eliminate electronic amplifier means which would otherwise be required in many applications if prior art transducing devices were employed.

The present invention is an alternating current device and basically comprises an autotransformer having a plurality of taps for developing equal increments of voltage; several inductive elements are disposed in magnetic flux linkage with the autotransformer and a switch means is arranged to connect the inductive elements progressively to autotransformer taps along the series, the switch means being operative in timed relation with the movement of an interpolating contact adapted to selectively tap any portion of the voltage developed by an inductive element connected to the autotransformer. The tapped voltage is thus derived from an inductive element which is energized by conductive connection with the autotransformer as well as inductive linkage therewith.

A distinctive feature of the present invention is that the inductive elements from which the interpolated voltage is derived are not connected across autotransformer taps and bridge adjacent taps only when the contact passes from one inductive element to the next. This operative relationship contributes to the highly desirable output impedance characteristic of the device by reason of which no undesirable loading effect occurs though comparatively large currents may be drawn from the device as contrasted to the current capabilities of prior art devices.

The primary object of the present invention is to convert an analog input signal to an electrical signal of high precision and linearity.

An ancillary object of the present invention is to provide a high current output capacity in a precision transducer.

The present invention will be better understood from a description of the embodiments shown in the drawings and the accompanying explanation of their operation.

In the drawings, FIG. 1 is a schematic illustration of an embodiment of the present invention;

Figure 1:
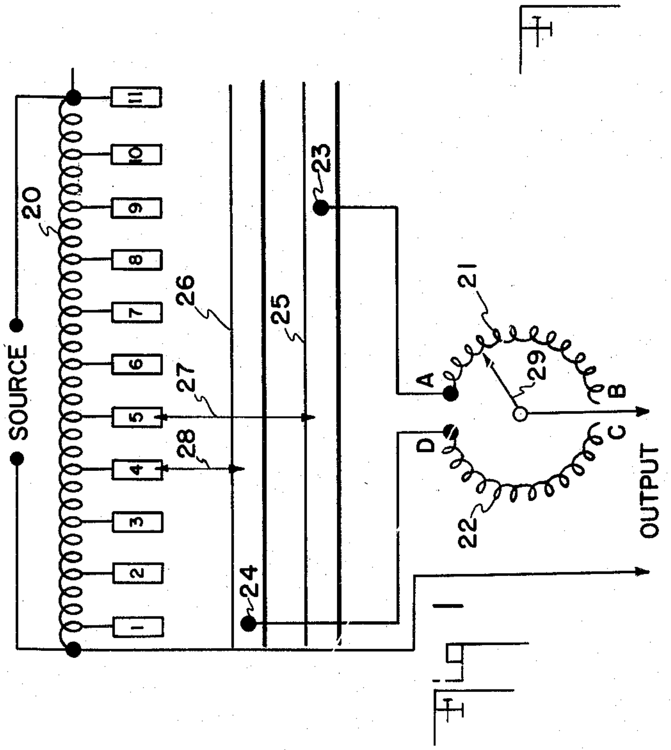

FIG. 1 illustrates an embodiment of the present invention wherein an autotransformer generally shown at 20 and energized by an alternating current source (not shown) is tapped at a number of equally spaced points Nos. 1 through 11. Two inductive elements 21 and 22 are disposed in magnetic flux linkage relationship with the autotransformer 20. It has been found that the present device may be constructed in convenient form by winding the autotransformer 20 on a toroidal core and bringing out the series of equally spaced taps Nos. 1 through 11 to commutator-like contacts. The inductive elements 21 and 22 may be wound on the same toroidal core, one end of each of the inductive elements 21 and 22 being brought out at convenient points for switching purposes as shown by 23 and 24, respectively.

Electrical connection is made between the inductive elements 21 and 22 and taps of the autotransformer 20 by switching means schematically illustrated as slip rings 25 and 26 and connectors 27 and 28. The switching operations are accomplished by movement of the connectors, each having one end in electrical connection with its associated slip ring while the other end of the connector is connected progressively to autotransformer taps along the series. Thus, connector 27 connects the inductive element 21 through slip ring 25 to taps Nos. 1 through 11 along the autotransformer 20. Similarly, connector 28 connects the inductive element 22 through slip ring 26 to autotransformer taps Nos. 1 through 11 along the series.

An interpolating contact 29 is disposed to selectively tap any portion of the voltage developed by the inductive elements 21 and 22 and is arranged to coact in timed relationship with the switching means so as to be operative at all times with an inductive element energized by conductive connection with the autotransformer 20 in addition to its inductive linkage therewith.

The mechanism for accomplishing the switching functions of the present invention may be conveniently carried out by an internal-external gear arrangement such as that disclosed in my copending application S.N. 380,284 wherein one of the gears is disposed to be eccentrically rotated about a central rotary axis to progressively make connections between an interpolating means and the taps of the autotransformer in the proper sequence. Alternatively, an arrangement of Geneva gears or other appropriate mechanical means may be employed to accomplish the switching functions as taught by the present invention.

The interpolating contact means of the present invention may also be similar to that illustrated in my copending application S.N. 380,284, now Patent No. 2,843,822 but it is important to note that the present invention differs from the device disclosed in that copending application in that the inductive elements of the present invention are separate and distinct from each other and are arranged to have only one end connected to the autotransformer taps.

Figure 2:
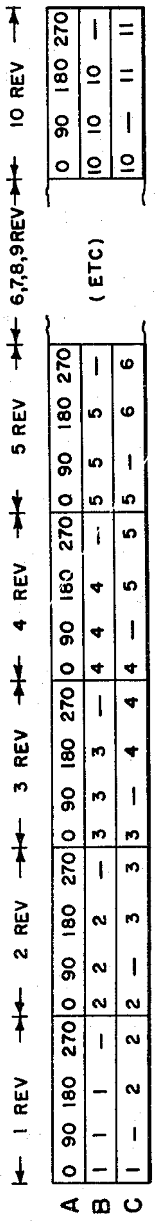
FIG. 2 is a table of the switching sequences performed during the operation of the embodiment of FIG. 1 through its range.

The table of FIG. 2 shows the progressive switching operations as carried out in connection with the embodiment of FIG. 1. The data of the table shows operation of the device through ten revolutions of the interpolating contact 29, each revolution being subdivided into angular rotation expressed in degrees as shown along line A. Line B tabulates the connection of slip ring 26 with autotransformer taps along the series while line C tabulates the connection of slip ring 25 with the autotransformer taps along the series.

From the table of FIG. 2, it may be seen that when the interpolating contact 29 is initially at a zero degrees position, the inductive elements 21 and 22 are connected through slip rings 25 and 26 to their respective connectors 27 and 28 to tap No. 1 of the series of taps along the autotransformer 20.

Assuming that the interpolating contact 29 is rotated in a counterclockwise direction through 90 degrees, the operation of the switch means is such that the connector 27 is moved out of contact with autotransformer tap No. 1. As the interpolating contact 29 is moved to a 180-degree position, connector 27 makes connection between slip ring 23 and tap No. 2 of the autotransformer 20 as well as inductive energization by reason of its electromagnetic relationship thereto.

In its rotation from 180 degrees to 360 degrees, the interpolating contact 29 is operative to tap the potential developed by inductive element 21. At approximately the 270-degree point in the rotation of the interpolating contact 29, slip ring 26 is disconnected from contact No. 1 of the autotransformer 20 and thereafter connected to tap No. 2 of the autotransformer 20 before the interpolating contact 29 begins to rotate through the second revolution of its operation.

The present invention conceives that each of the inductive elements 21 and 22 develop an induced voltage equal to one half the voltage increment between adjacent autotransformer taps of the autotransformer 20. Those skilled in the art will therefore appreciate that, when the inductive element 22 is connected to autotransformer tap No. 1, the interpolating contact 29 may be selectively positioned to tap any desired voltage between that appearing at autotransformer tap No. 1 and one half of the potential difference between autotransformer taps Nos. 1 and 2.

In accordance with the teaching of the present invention, the inductive elements 22 and 21 are arranged to be so disposed and switched that the voltages induced therein may be either additive or subtractive from the voltages appearing at the autotransformer taps Nos. 1 through 11 along the series. Thus, in the operation just explained, the induced voltage developed by inductive element 22 is arranged to be additive to that appearing at autotransformer tap No. 1. On the other hand, the induced voltage developed by inductive element 21 is arranged to be subtractive from the voltage appearing at autotransformer tap No. 2. The interpolating contact 29 may therefore be positioned to selectively tap any desired voltage increment between adjacent autotransformer taps.

One of the most desirable features of this arrangement is that a load connected to the interpolating contact 29 draws current only from the interpolating inductive element with the result that relatively high currents may be drawn by the load without adverse voltage drops or switching transients. Extremely high linearity is thus maintained and currents in the amount of several hundred milliamperes may be drawn from typically small and compact embodiments of the present device while maintaining precision within exacting specifications usually associated only with devices having relatively low current output capabilities.

Each of the second through tenth revolutions of the device is repetitive of the cycle of operation just described as will be seen from the required switching operations tabulated in FIG. 2. A ten-revolution device is shown in the embodiment of FIG. 1 for illustrative purposes and its performance tabulated in FIG. 2. It will be obvious to those skilled in the art, however, that the concept of the present invention is not limited to any particular number of revolutions and may be carried out in embodiments having any conveniently desirable number of autotransformer taps along the series, as well as being operative through any number of revolutions according to the requirements of the particular application for which the embodiment is designed.

Figure 3:
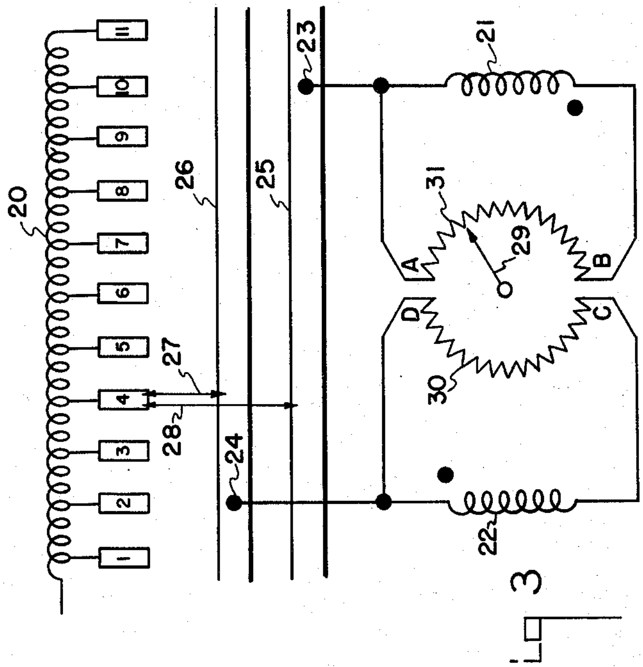
FIG. 3 is a schematic illustration of another embodiment of the present invention.

FIG. 3 illustrates a variant embodiment of the present invention which, like the embodiment of FIG. 1, includes two inductive elements 21 and 22. Components of the embodiment of FIG. 3 are designated by the same numbers as their counterparts in the embodiment of FIG. 1. The embodiment of FIG. 3, however, illustrates the manner in which resistive elements 30 and 31 may be connected in separate circuit with each of the inductive elements 21 and 22, respectively, so that the interpolating contact 29 is operative to tap any desired portion of the voltage developed by inductive elements 21 or 22 by being positioned along either of the resistive elements 30 or 31.

As was previously explained, an advantage of the present invention is that it is capable of supplying large load currents without significantly sacrificing the high precision and linearity of its output with respect to its analog input. It is, therefore, desirable that the inductive elements such as 21 and 22 be conductors of large cross-section so as to minimize ohmic resistance. Such heavy conductors, if wound on a toroidal form, will necessarily have relatively few turns as compared to a fine wire potentiometer resistance. While it is desirable to form the inductive elements of heavy conductors, one result of that choice is that the maximum resolution obtainable between adjacent turns of the inductive elements may be considerably less than would be possible with a fine wire resistive element. However, by connecting a resistive element in circuit with each of the inductive elements as shown in FIG. 3, the highly desirable characteristics and features of the present invention are preserved without the sacrifice of resolution.

The switching sequence and relationships are the same for the embodiment of FIG. 3 as that tabulated in FIG. 2 for the embodiment of FIG. 1, only one end of the inductive elements being connected to successive taps along the autotransformer in accordance with the concept of the invention. The embodiment of FIG. 3 also operates the same as the embodiment of FIG. 1 in the sense that the inductive elements 21 and 22 are never connected in shunt across autotransformer taps. The tabulation of switching operations set out in FIG. 2 is therefore equally applicable to the embodiment of FIG. 3.

Figure 4:
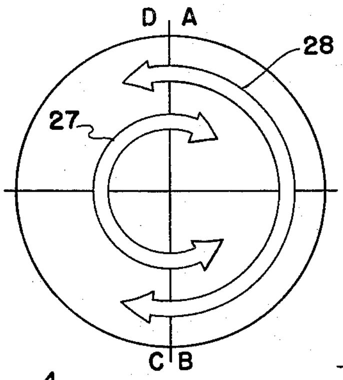
FIG. 4 is a schematic illustration of the timed relationship of the switching sequences performed in the operation of the embodiment of FIG. 3.

FIG. 4 schematically illustrates the timed relationship of the switching functions performed by the connectors 27 and 28 of the embodiments illustrated in FIGS. 1 and 3. The circular diagram of FIG. 4 represents one complete cycle of operation through 360 degrees of the interpolating contact 29. Points A, B, C, and D correspond to similarly designated points in the embodiments of FIGS. 1 and 3. The arcuate symbols 27 and 28 correspond to the angular dwell of connectors 27 and 28, respectively, in contact with taps of the autotransformer 20 throughout the rotation of the connector 29. It will be noted that at the points DA and CB, the dwell of the connectors 27 and 28 overlap so that a smooth and linearly varying output may be tapped by the interpolating contact 29 without any discontinuity. As schematically illustrated in FIG. 4 by the separation of the symbols representing dwell of the two connectors 27 and 28, conductive connection is made to adjacent autotransformer taps by the connectors 27 and 28 during the period of dwell overlap.

Figure 5:
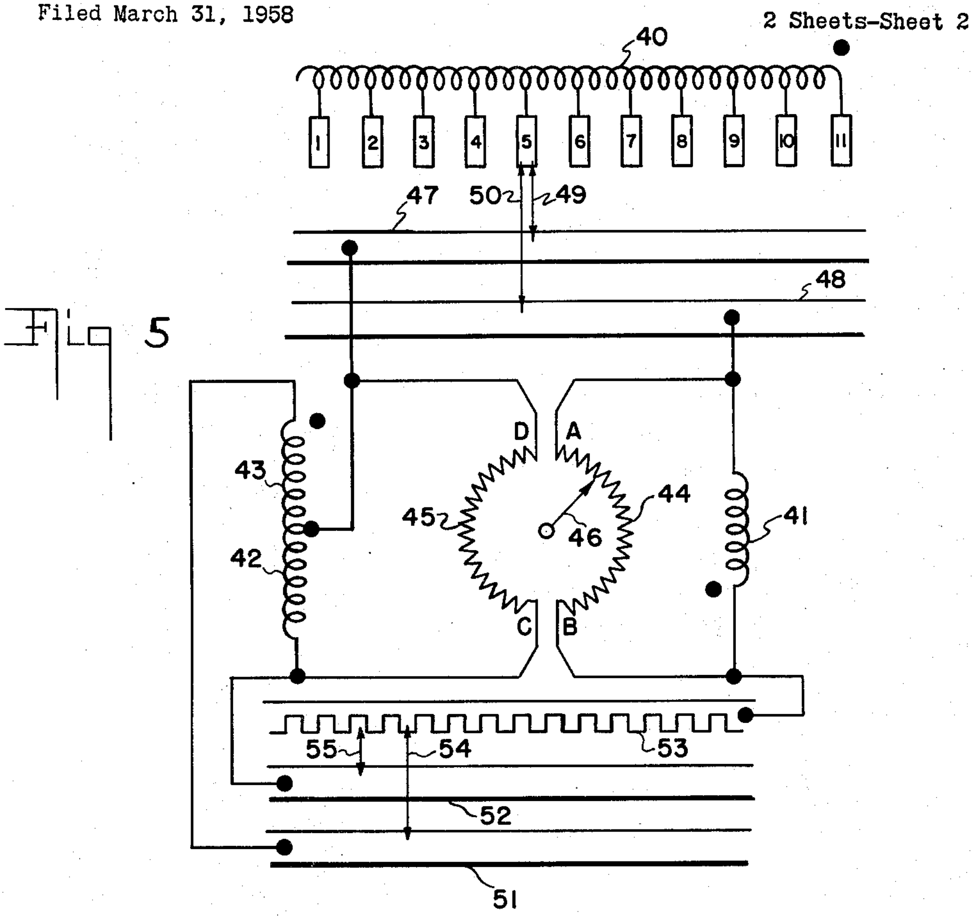
FIG. 5 is a schematic illustration of another embodiment of the present invention.

FIG. 5 illustrates a variant embodiment of the present invention which comprises an autotransformer 40 similar to that shown in the embodiments of FIGS. 1 and 3. A plurality of taps Nos. 1 through 11 are arranged and disposed as previously explained in connection with the other embodiments illustrated. The embodiment of FIG. 5 differs from the embodiment of FIG. 3 in that it employs three inductive elements as shown at 41, 42 and 43. Two of the inductive elements 41 and 42 are permanently connected in circuit with resistances 44 and 45, respectively.

An interpolating tap 46 is arranged and disposed to operate rotatably to tap any portion of the voltage developed by the inductive elements 41, 42 and 43. The inductive elements 42 and 43 are serially connected to each other and the resistive element 45 is connected in parallel relation with inductive element 42. The series connection between inductive elements 42 and 43 is also connected to a slip ring 47. Similarly, one end of the inductive element 41 is connected to a slip ring 48. Two connectors 49 and 50 are arranged and disposed to complete conductive connection between respective inductive elements and autotransformer taps along the series by making contact between slip rings 47 and 48 and respective autotransformer taps 1 through 11.

Thus far, the description of FIG. 5 is similar to the embodiment of FIG. 3 wherein two inductive elements are employed, connected and disposed in much the same manner as inductive elements 41 and 42 of the embodiment of FIG. 5. The additional inductive element 43 of the embodiment of FIG. 5 has one end connected to a slip ring 51 while an end of inductive element 42 is connected to yet another slip ring 52. An end of the inductive element 41 is connected to commutator 53. Connectors 54 and 55 operate in synchronism with the interpolating contactor 46 and the connectors 49 and 50 to connect the three inductive elements 41, 42 and 43 in rotation to adjacent autotransformer taps so that two of the inductive elements, 41 and 42, are always connected to be operatively employed to derive an interpolated voltage by positioning the interpolating contactor 46.

Inductive elements 42 and 43 are serially connected and, in the operation of the device, inductive element 43 is so connected as to develop the same voltage as that appearing across inductive element 41. Consequently, the voltage developed by inductive element 42 is the succeeding one-half increment of the voltage appearing across adjacent autotransformer taps.

It should be borne in mind that the autotransformer and the separate inductive elements of the present invention are usually formed by being wound about the same toroidal core and are necessarily in magnetic flux linkage with each other. The schematic diagrams as used herein show the windings of the autotransformer and the inductive elements separately for purposes of explanation only and in the interests of clarity.

Figure 6:
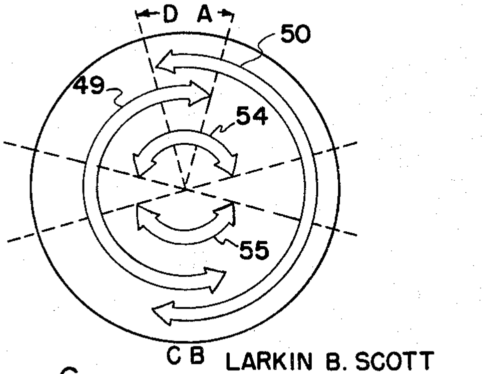
FIG. 6 is a schematic illustration of the timed relationship of the switching sequences performed in the operation of the embodiment of FIG. 5.

FIG. 6 schematically illustrates the timed relationship of the switching functions performed by the several connectors 49 and 50, 54 and 55 in coaction with the slip rings 47, 48, 51 and 52 and the commutator 53. The cricular diagram of FIG. 6 represents one complete cycle of operation through 360 degrees of the interpolating contact 46. Points A, B, C, and D correspond to similarly designated points in the embodiment of FIG. 5. The arcuate symbols 49, 50, 54 and 55 of FIG. 6 correspond to the angular dwell of connectors 49, 50, 54 and 55, respectively, for their periods of operative connection throughout a complete rotation of the interpolating contactor 46.

In the operation of the embodiment of FIG. 5, it will be noted that the dwell periods of connectors 49 and 50 are required to have an angular overlap at the points DA and CB. The angular overlap of the dwell of connectors 49 and 50 at the point DA must be in common with an overlapping portion of the dwell of connector 54 but must not overlap any portion of the dwell of connector 55. Similarly, the angular overlap of the dwell of connectors 49 and 50 through the sector CB must be in common with an overlap of the dwell of connector 55 but must not overlap any portion of the dwell of connector 54. Another requirement is that the dwell of connectors 54 and 55 must not overlap each other.

The sector DA may be designated as the commutator overlap. It has been found that the angular gap between the dwell of connectors 54 and 55 should be nominally equal to the commutator overlap. In the illustration of FIG. 6, each of these angular gaps is shown as being approximately 30 degrees. The concept of the present invention, however, is not so limited and, in fact, it has been found that by providing a 60-degree gap between the dwell of the connectors 54 and 55, the theoretical backlash of the device may be as much as 180 degrees without impairing its operation.

Thus, a device embodying the present invention offers an extraordinarily wide-range of latitude in respect of backlash tolerances, making it possible to construct a high-precision electrical device which requires only quite ordinary and easily achieved mechanical tolerances, tap spacing, commutator construction, etc.

Those skilled in the art will appreciate the many advantages of the present invention over prior art devices. In many known electrical transducers, undesirable voltage gradient in the interpolating impedances is caused by current drawn directly from the main source of major increments of voltage, i.e., such as an autotransformer. The higher the load demand, the more serious this source of error becomes. Thus, in prior art devices, it was necessary to have a high impedance value for the interpolating element in order to minimize loading error.

In the present invention, however, the interpolating element never is connected in parallel with the primary source of major increments of voltage. Therefore, output current is drawn from the auxiliary inductive elements. This makes it possible to have a low impedance interpolating element without incurring adverse loading effects. Consequently, high current outputs are possible with the devices of the present invention.

Additionally, the switching requirements of the present invention are simplified as compared to known devices. In a number of typical prior art devices, the switching operations are comparatively complicated since four or more interpolating element leads are required to be switched, whereas in the simplest version of the present invention only two leads of the interpolating elements need be switched.

Moreover, with the voltage source (i.e., the auxiliary inductive elements as shown in the embodiments of FIGS. 3 and 5) permanently and continuously connected to a high resistance interpolating element, the input impedance to the transducer is constant and no switching transient is created, thereby eliminating another source of error and contributing to the high precision and linearity of the electrical output produced by the present invention.

Since many changes could be made in the specific combinations of apparatus disclosed herein and many apparently different embodiments of this invention could be made without departing from the scope thereof, it is intended that all matter contained in the foregoing description or shown in the accompanying drawings shall be interpreted as being illustrative and not in a limiting sense.

I claim:

1. An electrical apparatus comprising an autotransformer having a series of taps for developing equal increments of voltage, means for deriving voltages intermediate those on the taps including at least two inductive elements disposed in magnetic flux linkage with said autotransformer, said inductive elements being fixedly mounted with respect to each other and with respect to said autotransformer, each of said elements developing an induced voltage equal to one half said voltage increment between adjacent autotransformer taps, switch means for independently connecting one end of each of said inductive elements in progressive rotation to autotransformer taps along the series, and a movable contact adapted to selectively tap any portion of the voltage developed by said inductive elements, the movement of said contact being so synchronized with the operation of said switch means that said contact is operative at all times with an inductive element energized by conductive connection with said autotransformer in addition to inductive linkage therewith.

2. An electrical apparatus comprising an autotransformer having a series of taps for developing equal increments of voltage, means for deriving voltages intermediate those on the taps including two inductive elements disposed in magnetic flux linkage with said autotransformer, said inductive elements being fixedly mounted with respect to each other and with respect to said autotransformer, each of said elements developing an induced voltage equal to one half the voltage increment between adjacent autotransformer taps, switch means for independently connecting one end of each of said inductive elements to adjacent autotransformer taps progressively along the series, and a contact movable along said inductive elements, the movement of said contact being so synchronized with the operation of said switch means that said contact is operative at all times upon an inductive element energized by conductive connection with said autotransformer in addition to inductive linkage therewith.

3. An electrical apparatus comprising an autotransformer having a series of taps for developing equal increments of voltage, means for deriving voltages intermediate those on the taps including two inductive elements disposed in magnetic flux linkage with said autotransformer, each of said elements developing an induced voltage equal to one half the voltage increment between adjacent autotransformer taps, a resistive element connected across each said inductive element, switch means for connecting one end of said inductive elements to adjacent autotransformer taps progressively along the series, and a contact movable along said resistive elements to selectively tap any portion of the voltage developed by said inductive elements, the movement of said contact being so synchronized with the operation of said switch means that said contact is operative at all times on a resistive element in circuit with an inductive element energized by conductive connection with said autotransformer in addition to inductive linkage therewith.

4. An electrical apparatus comprising an autotransformer having a series of taps for developing equal increments of voltage, means for deriving voltages intermediate those on the taps including three inductive elements disposed in magnetic flux linkage with said autotransformer said inductive elements being fixedly mounted with respect to each other and with respect to said autotransformer, each of said elements developing an induced voltage equal to one half said voltage increment between autotransformer taps, switch means for independently connecting one end of each of said inductive elements in progressive rotation to autotransformer taps along the series, and a movable contact adapted to selectively tap any portion of the voltage developed by said inductive elements, the movement of said contact being so synchronized with the operation of said switch means that said contact is operative at all times with an inductive element energized by conductive connection with said autotransformer in addition to inductive linkage therewith.

5. An electrical apparatus comprising an autotransformer having a series of taps for developing equal increments of voltage, means for deriving voltages intermediate those on the taps including first, second, and third inductive elements disposed in magnetic flux linkage with said autotransformer, said first and second inductive elements being serially interconnected and each of said three elements developing an induced voltage equal to one half said voltage increment between adjacent autotransformer taps, a resistive element connected across one of said first and second serially interconnected inductive elements, a resistive element connected across said third inductive element, switch means for connecting one end of each of said inductive elements in progressive rotation to autotransformer taps along the series, and a contact movable along said resistive elements to selectively tap any portion of the voltage developed by said inductive elements, the movement of said contact being so synchronized with the operation of said switch means that said contact is operative at all times with an inductive element energized by conductive connection with said autotransformer in addition to inductive linkage therewith.

No references cited.